United States Patent [19]
Davis

[11] Patent Number: 6,016,872
[45] Date of Patent: Jan. 25, 2000

[54] METHOD FOR REMOVING DEBRIS FROM A WELL-BORE

[75] Inventor: Lloyd Keith Davis, Stevenville, Tex.

[73] Assignee: Forta Corporation, Grove City, Pa.

[21] Appl. No.: 08/821,193

[22] Filed: Mar. 17, 1997

[51] Int. Cl.[7] .................................................. E21B 37/00
[52] U.S. Cl. .............................................................. 166/312
[58] Field of Search ............................... 166/304, 305.1, 166/312, 376

[56] References Cited

U.S. PATENT DOCUMENTS

| | | |
|---|---|---|
| 2,727,001 | 12/1955 | Rowe . |
| 3,025,235 | 3/1962 | Canterino . |
| 3,284,353 | 11/1966 | Batdorf et al. . |
| 3,336,269 | 8/1967 | Monagle et al. . |
| 3,660,183 | 5/1972 | Knowles et al. . |
| 3,816,308 | 6/1974 | LeBlanc . |
| 3,993,133 | 11/1976 | Clampitt . |
| 4,456,061 | 6/1984 | Swift, Jr. et al. ................... 166/312 X |
| 4,490,261 | 12/1984 | Heilweil . |
| 4,498,994 | 2/1985 | Heilweil . |
| 4,609,476 | 9/1986 | Heilweil . |
| 4,619,773 | 10/1986 | Heilweil et al. . |
| 4,726,906 | 2/1988 | Chen et al. . |
| 4,830,765 | 5/1989 | Perricone et al. . |
| 5,004,553 | 4/1991 | House et al. . |
| 5,034,139 | 7/1991 | Reid et al. . |
| 5,087,611 | 2/1992 | Forrest . |
| 5,118,664 | 6/1992 | Burts, Jr. . |
| 5,215,151 | 6/1993 | Smith et al. . |
| 5,284,207 | 2/1994 | Bittleston et al. . |
| 5,330,005 | 7/1994 | Caid et al. ......................... 166/292 X |
| 5,363,928 | 11/1994 | Wittliff . |
| 5,377,760 | 1/1995 | Merrill .................................... 166/295 |
| 5,431,237 | 7/1995 | Wittliff . |
| 5,439,058 | 8/1995 | Malbrel et al. . |
| 5,547,925 | 8/1996 | Duncan, Jr. . |

*Primary Examiner*—William Neuder
*Attorney, Agent, or Firm*—Kirkpatrick & Lockhart LLP

[57] ABSTRACT

The present invention provides a method for cleaning debris from a well-bore and includes the steps of injecting hydrophilic fibers selected from the group consisting of polyolefins, polyesters and nylons, suspended or dispersed in a water based or oil based liquid into a well-bore and forcing the suspension upwards, through the length of the well-bore, to its open end. In particular, the suspension is directed through sections of the well-bore holding quantities of debris formed from the drilling operation. The suspension loosens the debris and sweeps substantial quantities of debris from the well-bore.

19 Claims, 1 Drawing Sheet

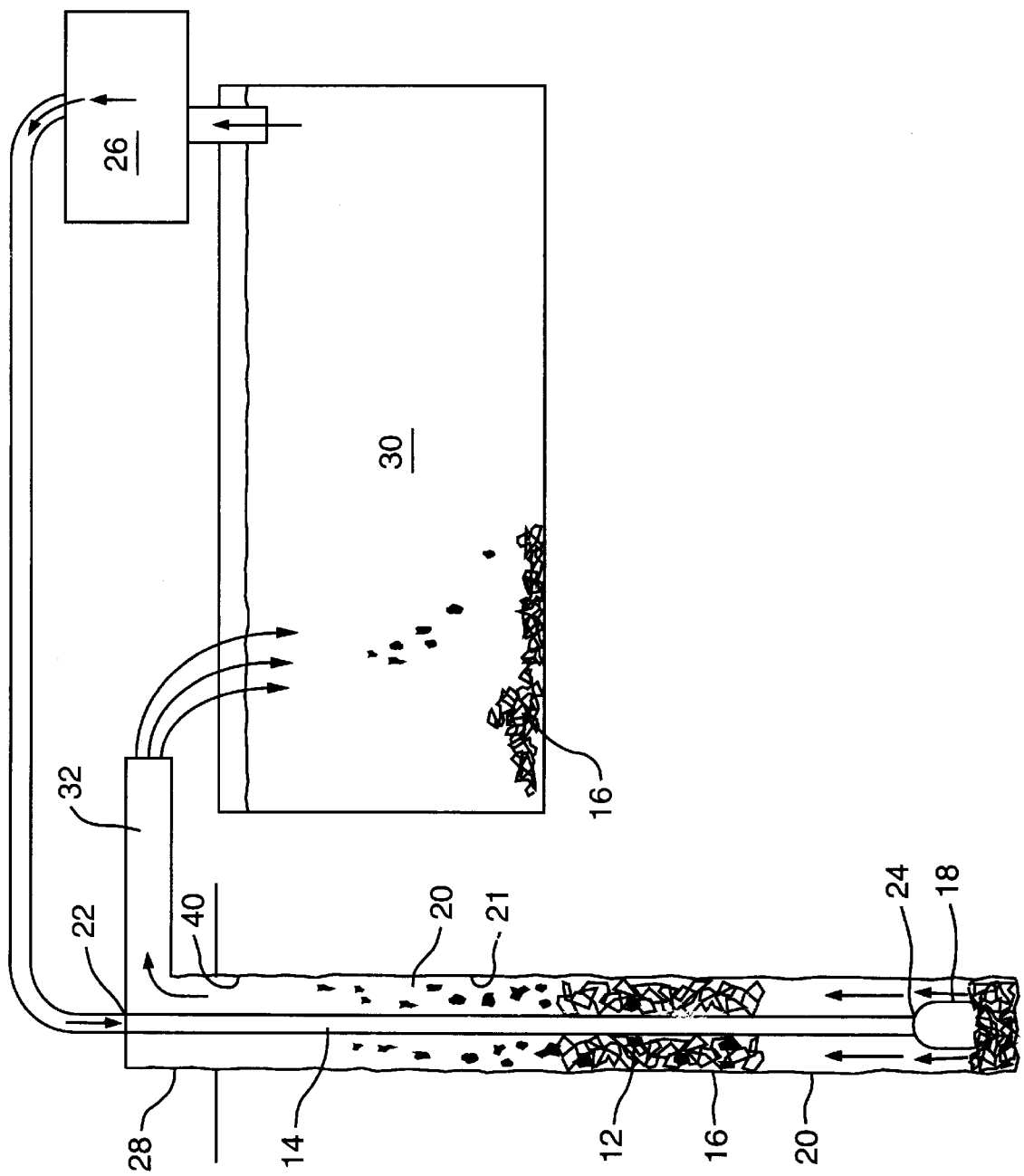

METHOD FOR REMOVING DEBRIS FROM A WELL-BORE

BACKGROUND OF THE INVENTION

1. Field of the Invention

The present invention relates to a method for removing debris from a well-bore, and more particularly, to the use of a liquid suspension containing hydrophilic fibers to sweep debris from the bore.

2. Description of the Background of the Invention

Oil, gas and other subterranean wells are made by drilling a borehole into the ground. As the rotating drill works its way through the geological formations, the drill becomes hot and debris from the cuttings, such as rock, dirt and clay, accumulates, filling the hole. To cool and lubricate the drill and remove the build up of drill cuttings from the borehole, various methods have been used. Typically, fresh water, salt water, or a water/oil mixture is used to flush the cuttings from the well-bore and to cool the drill. However, the liquid alone does not remove enough debris. To improve the levels of debris removal, additives are injected with the liquid through the drill pipe into the well-bore. The liquid is forced through the annulus created between the drill pipe and the wall of the borehole to carry the debris out of the borehole and simultaneously to cool and lubricate the drill.

A variety of additives have been used with drilling liquids. Viscosifiers, such as bentonite clay, Fullers' earth (attipigulite clay) and polyacrylamide fibers are dissolved in the liquid to increase its viscosity. Other materials, such as asbestos fibers, cotton seed fibers, wood cellulose and crushed peanut hulls, have been dispersed in the liquid. The latter group of additives do not dissolve. Some of these additives have been observed to work well in fresh water but do not work well, or at all, in salt water.

Another reason to include additives is to prevent fluid loss through fissures and pores in the geologic formations. Significant amounts of liquid injected into the well bore can be lost through porous rock or open channels in the formations. Additives sometimes function to stem the loss of circulation fluid by sealing the porosity and channel openings of the formations.

The addition of these materials, however, slows the penetration of the drill through the earth. Slower penetration leads to increased operation time, higher energy costs, increased use of liquid and increased use of additives for the additional liquid.

There is a need for a method of cleaning well-bores which will not retard penetration of the drill and will not result in increased time and energy costs. There is a further need for a method which works to remove the debris whether the liquid used is fresh or salt water, or oil based.

SUMMARY OF THE INVENTION

The present invention provides an improved method for removing debris from a well-bore. In a well-bore wherein one end of the well-bore is open and the other end is remote from the open end, the method includes the steps of directing a liquid suspension into the well-bore to a location between the remote end of the well-bore and the debris to be removed and causing the liquid suspension to move toward the open end of the well-bore, thereby carrying the debris to the open end. More specifically, the method of the present invention includes the steps of injecting under pressure a liquid suspension into a conduit positioned in the bore wherein the conduit and the bore define an annulus between them. The method further includes the steps of sweeping unwanted material from the annulus by directing the liquid suspension through the annulus to the unwanted materials and to the open end of the bore. The liquid suspension carries major amounts of debris contained within the annulus to the open end of the bore. The debris-containing suspension is then preferably directed to a settling tank. Alternatively, it is directed to a series of screens wherein the debris and fibers are removed from the liquid by agitation and filtration. The liquid is preferably recycled back for further use in the drilling and/or debris removal operation.

The method of the present invention relies on the improved liquid suspension which enhances the carrying capacity of the drilling liquid without increasing the viscosity of the liquid. The liquid suspension includes a liquid and a plurality of hydrophilic fibers dispersed within the liquid. Examples of suitable fibers may be selected from the group consisting of the polyolefins, such as polypropylene and polyethylene, nylon and polyester. The most preferred fiber is a polypropylene coated with a hydrophilic surfactant.

BRIEF DESCRIPTION OF THE DRAWING

The present invention will be better understood by reference to FIG. 1 which provides a schematic section view of a well-bore sweeping operation.

DETAILED DESCRIPTION OF THE PREFERRED EMBODIMENTS

The present invention includes the steps of injecting hydrophilic fibers suspended or dispersed in a liquid into a well-bore and forcing the suspension upwards, through the length of the well-bore, to its open end. In particular, the suspension is directed through sections of the well-bore holding quantities of debris formed from the drilling operation. The suspension loosens the debris and sweeps substantial quantities of debris from the well-bore without increasing the viscosity of the drilling liquid and thereby slowing the drill.

Referring to FIG. 1, there is shown schematically those aspects of a typical well-bore and drilling system pertinent to the method of the present invention. A bore 12 is drilled into a formation by means of any suitable known drilling equipment, including a drill pipe 14 and accompanying drill bit 18. For purposes of the present invention, the drill pipe 14 is a hollow conduit through which a liquid may pass. An annulus 20 is defined between the exterior of the drill pipe 14 and the wall 21 of the bore 12. A settling tank 30 is fluidly connected to a suction pump 26 which in turn is fluidly connected to the hollow interior of the drill pipe 14. A liner 40 may be inserted into the bore 12 to maintain its integrity. The liner 40 preferably has a cap 28 and outlet conduit 32 which empties into the settling tank 30. Debris 16, such as rock, dirt and clay, is created by the drilling. To remove the debris, the method of the present invention directs the liquid fiber suspension from the settling tank 30, through the drill pipe 14 and through the annulus 20 where the suspension contacts the debris and carries it to the surface of the well-bore 12 to outlet conduit 32. The suspension thereby sweeps the debris from the well-bore 12 as it is forced through the annulus 20.

The fibers used in liquid suspension of the method of the present invention are preferably wetable in various liquids, particularly in fresh water, salt water, water based drilling fluids and in oil based drilling liquids. Moreover, unlike the conventional additives heretofore used, the preferred fibers disperse in each of the foregoing liquids to create a homogenous matrix of suspended fibers which will suspend or reduce the velocity of settling solids in static conditions but which will behave like a fluid when pumped or agitated. In this regard the suspension exhibits excellent thixotropic properties.

The fibers are hydrophilic fibers selected from the group consisting of polyolefins, polyester and nylon. The preferred fibers are the polyolefins, polypropylene and polyethylene, and the most preferred is polypropylene. Preferably, from 0.5 to 6 lbs. of fibers, and more preferably 0.5 to 2 lbs. of fibers, are used per 42 gallon barrel of liquid. Variation in the concentration can be tolerated. The fibers are most preferably comprised of a plurality of filaments processed in a tow form in bundles or in strips, from about one to two hundred, and preferably from two to six denier per filament (dpf). and most preferably from three to four denier. Alternatively, the fibers may be formed from fibrillated fibers, wherein the fibers are formed in interconnected networks. In yet another embodiment, the fibers may be a plurality of nonbundled monofilaments. The fiber strips are preferably cut in lengths of from about three or four millimeters to ten millimeters. Longer lengths may be used, but the longer the fiber length the more likely the fibers will become entangled in the drill. Thus, lengths of about ten millimeters or less are preferred, and lengths between about five and ten millimeters are most preferred. The fibers may be naturally hydrophilic or may be coated with a hydrophilic coating, such as a surfactant. Examples of suitable fibers include polypropylene, polyethylene, nylon and polyester. The most preferred fiber is a polypropylene coated with a hydrophilic surfactant.

A series of tests were performed to evaluate various synthetic fibers for their suitability for use in the method of the present invention.

EXPERIMENT 1

Each of the following fibers were tested: polypropylene fibers treated with a hydrophilic surfactant; nylon; polyethylene treated with a hydrophilic surfactant; and polyester. The nylon and polyester are naturally hydrophilic. All fibers were 5 mm, 3 denier.

Two grams of each kind of fiber was stirred into a different one of each of the following liquids and allowed to sit for one hour: 350 ml tap water; 350 ml salt water; 350 ml drilling fluid comprised of tap water and 15 grams of bentonite clay; and, 350 ml diesel oil.

In all sixteen samples, all of the fibers were observed to be easily wetted, to disperse with minimal agitation and to remain suspended. In addition, the liquid-fiber mixtures behaved like free flowing fluids when stirred or poured.

EXPERIMENT 2

Experiment 1 was repeated using 4 grams of each of the types of the fibers in 350 ml of each of the types of liquid. Each mixture was allowed to sit for one hour, as described in experiment 1. Then, steel shot having a diameter of 4.5 mm and weighing approximately 0.33 grams each were dropped onto the surface of each mixture. In all sixteen samples, the matrix created by the suspended fibers in liquid prevented the free fall of the shot. After a period of 24 hours, the shot remained suspended in each sample. When the mixtures were stirred or poured, each mixture behaved as a free flowing liquid.

EXPERIMENT 3

Experiment 1 was repeated using 6 grams of each of the types of fiber in 350 ml of each of the types of liquid. After the mixture sat for one hour, half inch glass marbles weighing approximately 3.5 grams each were dropped onto the surface of each mixture. All mixtures stopped the fall of the marbles and suspend the marbles for the entire 24 hour test period. All samples behaved like free flowing liquids when stirred or poured.

The foregoing experiments demonstrate that the liquid suspension used in the method of the present invention is useful in water based as well as oil based liquids and in fresh water as well as salt water. Further, the foregoing experiments demonstrate that relatively small concentrations of fiber will support relatively large weights of debris for extended periods and further that the suspension will flow freely like a liquid. The latter observation is important as evidence of the improved capability of the liquid suspension of the present invention to hold debris for removal without an increase in viscosity sufficient to retard the penetration of the drill through the formation, a problem regularly encountered with many conventional drilling fluid additives.

In other experiments it has been determined that hydrophobic fibers do not adequately sweep the debris from the well-bore. Only hydrophilic fibers may be used. However, the hydrophilic character of the fiber may be inherent in the material itself, it may be attributed to the extrusion process in which the fibers are made, or it may be due to the addition of a hydrophilic coating, such as a hydrophilic surfactant. Any suitable known hydrophilic surfactant will suffice.

In use the suspension is premixed, perhaps in the settling tank 30. Fibers cut into lengths up to 10 mm, and preferably from 4 mm to 10 mm, and more preferably from 5 mm to 10 mm are added to the desired liquid and stirred to evenly disperse the fibers throughout the liquid. From 0.5 to about 6 pounds of fiber are added for each barrel of liquid. Each barrel holds about 42 gallons.

In the preferred embodiment of the debris removal method, a liquid suspension comprised of 5 mm 3 denier strips of polypropylene fibers coated with a hydrophilic surfactant suspended in either a water based or an oil based liquid in a concentration of about 2 lbs. of fibers for each 42 gallons of liquid are pumped from tank 30 by means of pump 26 into the top end 22 of the drilling pipe 14 and forced to the bottom end 24 of the drilling pipe 14 past the drill bit 18 into a remote end of the well-bore 12. The suspension enters the annulus 20 defined between the wall 21 of the well-bore 12 and the exterior of the drilling pipe 14. The annulus 20 will contain the drill cuttings—rock, dirt, clay and similar debris—from the drilling operation. The continuing flow of liquid suspension being pumped into the well-bore 12 through the drilling pipe 14 forces the suspension from the remote end towards the open end of the well-bore 12. The suspension carries the debris with it to the open end at cap 28 and to the outlet conduit 32 for delivery back to the settling tank 30. Alternatively, the outlet 32 may lead to a series of troughs (not shown) having screened bottoms and equipped with agitation mechanisms for filtering the liquid from the solids removed from the well-bore 12.

In experiments done in plexiglass u-tubes to permit visualization of the flow of the suspension and movement of solids placed in the u-tube, the liquid-polypropylene fiber suspension was observed to form a matrix in which the solids were suspended and carried to the open end at the surface. It is believed that the individual fibrils that make up the fibers open and disperse throughout the liquid to form the matrix which binds up the solids in the annulus.

In field studies of the method of the invention, significant quantities of debris from drill cuttings were carried to the surface with the flow of the liquid-fiber suspension. Furthermore, the field observations showed that the addition of the suspension to the well-bore did not slow the rate of the drill's penetration through the formation. This is believed to be due to the fact that the suspension behaves like a free flowing liquid and does not appear to increase the viscosity of the drilling fluid.

The method of the present invention provides a useful and much needed means of cleaning debris from a well-bore which may be used with a variety of drilling fluids and which will not retard the rate of penetration of the drill through the geologic formation.

What I claim is:

1. A method of cleaning unwanted materials from a bore comprising:

injecting under pressure a liquid suspension into a conduit inserted into said bore wherein the conduit and the bore define an annulus therebetween;

sweeping unwanted materials from the annulus by directing the liquid suspension through the annulus to the unwanted materials;

wherein the liquid suspension comprises hydrophilic fibers selected from the group consisting of polyolefin, polyester and nylon, suspended in a liquid.

2. The method of claim 1 wherein the fibers are up to 10 mm in length.

3. The method of claim 1 wherein the fibers are from 4 mm to 10 mm in length.

4. The method of claim 1 wherein about 0.5 to 6.0 lb of fiber are added per 42 gallons of liquid.

5. The method of claim 1 wherein about 0.5 to 2.0 lb of fiber are added per 42 gallons of liquid.

6. The method of claim 1 wherein the fibers are polyolefin fibers selected from the group consisting of polyethylene and polypropylene.

7. The method of claim 6 wherein the fibers are polypropylene fibers coated with a hydrophilic surfactant.

8. In a well-bore having debris present therein and having two ends wherein one end of the well-bore is open and the other end is remote from the open end, a method comprising the steps of:

directing a liquid suspension into the well-bore to a location between the remote end of the well-bore and the debris to be removed therefrom;

causing the liquid suspension to move toward the open end of the well-bore past the debris, thereby carrying the debris to the open end;

directing the debris containing suspension out of the well-bore;

wherein the liquid suspension is comprised of a plurality of hydrophilic fibers suspended in a liquid, the fibers selected from the group consisting of polyolefin, polyester and nylon.

9. The method of claim 8 wherein the fibers are up to 10 mm in length.

10. The method of claim 8 wherein the fibers are from 4 mm to 10 mm in length.

11. The method of claim 8 wherein about 0.5 to 6.0 lb of fiber are added per 42 gallons of liquid.

12. The method of claim 8 wherein about 0.5 to 2.0 lb of fiber are added per 42 gallons of liquid.

13. The method of claim 8 wherein the fibers are polyolefin fibers selected from the group consisting of polyethylene and polypropylene.

14. The method of claim 13 wherein the fibers are polypropylene fibers coated with a hydrophilic surfactant.

15. A method for sweeping debris from a well-bore comprising the steps of:

pumping a suspension of hydrophilic polyolefin fibers into a conduit positioned in the well-bore, the conduit extending from an open end to a remote end of the well-bore and defining an annulus between the conduit and the well-bore;

directing the suspension to the remote end of the well-bore, then through the annulus to the open end of the well-bore such that the suspension carries debris contained within the annulus to the open end of the well-bore.

16. The method of claim 15 wherein the fibers are a length up to 10 mm.

17. The method of claim 15 wherein the fibers are from 4 mm to 10 mm in length.

18. The method of claim 15 wherein about 0.5 to 2.0 lb of fiber are added per 42 gallons of liquid.

19. The method of claim 15 wherein the fibers are polypropylene fibers coated with a hydrophilic surfactant.

* * * * *